United States Patent [19]

Orlando

[11] 4,340,237
[45] Jul. 20, 1982

[54] LIFTING AND STEERING SYSTEM FOR A VEHICLE AND A VEHICLE USING THE SAME

[75] Inventor: Franklin P. Orlando, Morgan Hill, Calif.

[73] Assignee: FMC Corporation, Chicago, Ill.

[21] Appl. No.: 163,257

[22] Filed: Jun. 26, 1980

[51] Int. Cl.³ ............................................. B62D 7/06
[52] U.S. Cl. .................... 280/92; 188/322.17; 280/672
[58] Field of Search ................ 280/6 R, 6 H, 92, 672, 280/275; 188/322

[56] References Cited

U.S. PATENT DOCUMENTS

| | | | |
|---|---|---|---|
| 2,890,892 | 6/1959 | Strehlow | 280/92 |
| 3,150,867 | 9/1964 | Droegkamp | 280/6 H |
| 4,138,131 | 2/1979 | Sommer | 280/92 |
| 4,200,269 | 4/1980 | Ludwig | 280/6 H |

Primary Examiner—Joseph F. Peters, Jr.
Assistant Examiner—John A. Carroll
Attorney, Agent, or Firm—Louis J. Pizzanelli; Richard B. Megley

[57] ABSTRACT

The present invention refers to a lifting and steering system for a vehicle. The system comprises a hydraulic system having a piston with a rod in the form of another inner cylinder, the lower end of which serves for mounting a steerable wheel of the vehicle. Another rod projects through the upper end of the hydraulic cylinder and its lower end projects through the piston to the interior of the inner cylinder. A guide member is provided for permitting relative axial movement between the piston and the second mentioned rod while causing rotation therebetween. Passages are also provided to permit the introduction and withdrawal of hydraulic fluid from the space above the piston, to the space within the interior of the inner cylinder.

14 Claims, 5 Drawing Figures

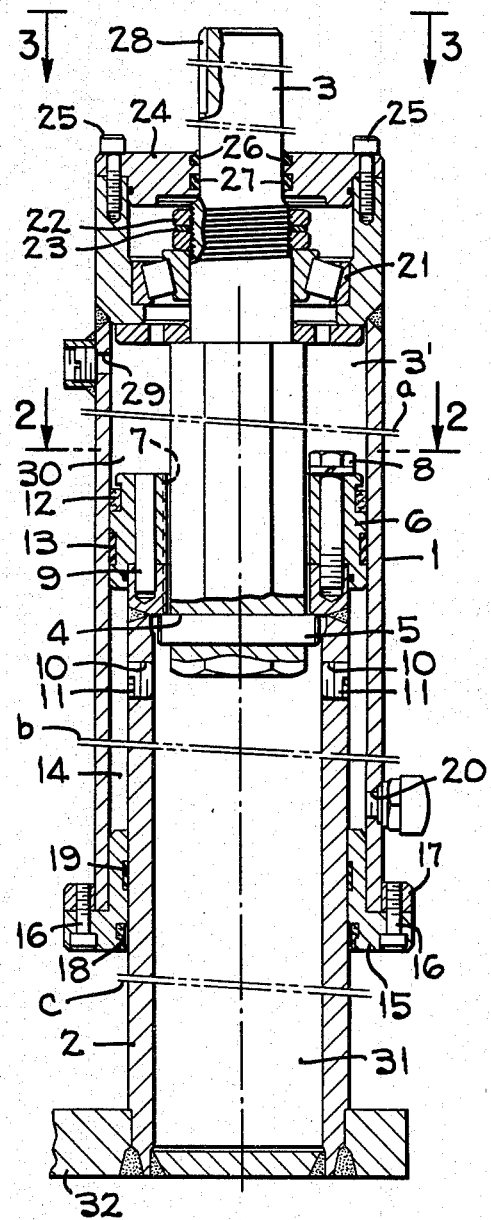
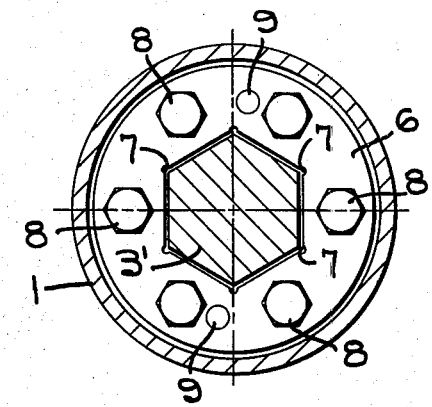
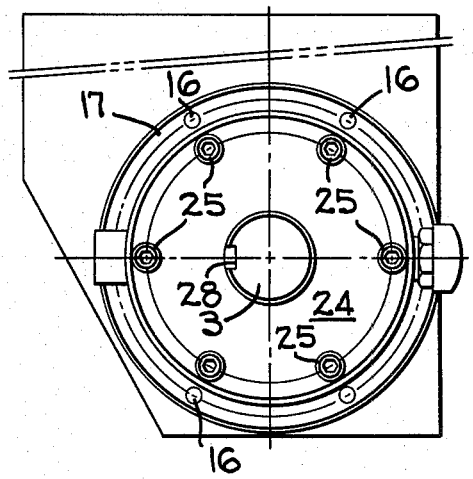

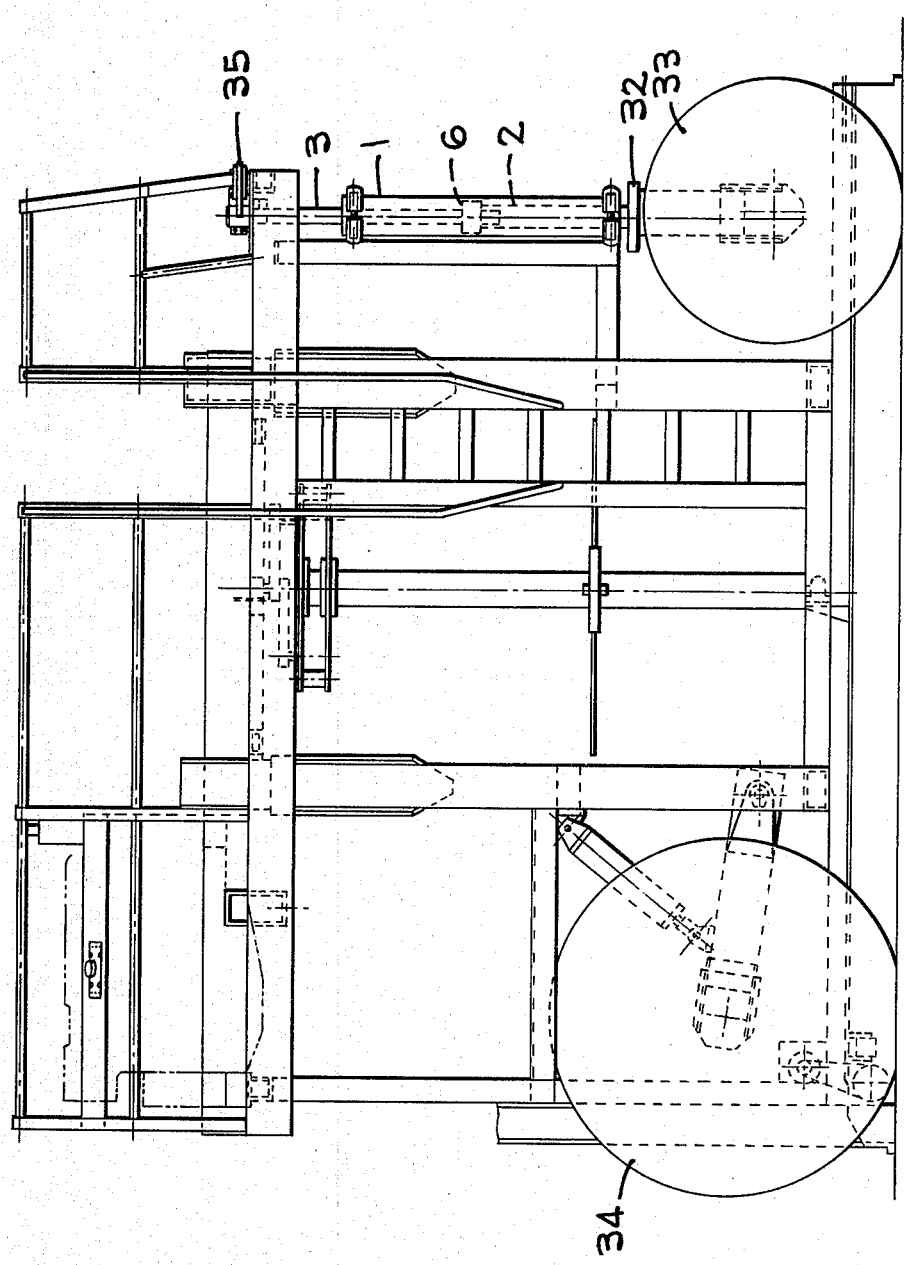
FIG_4

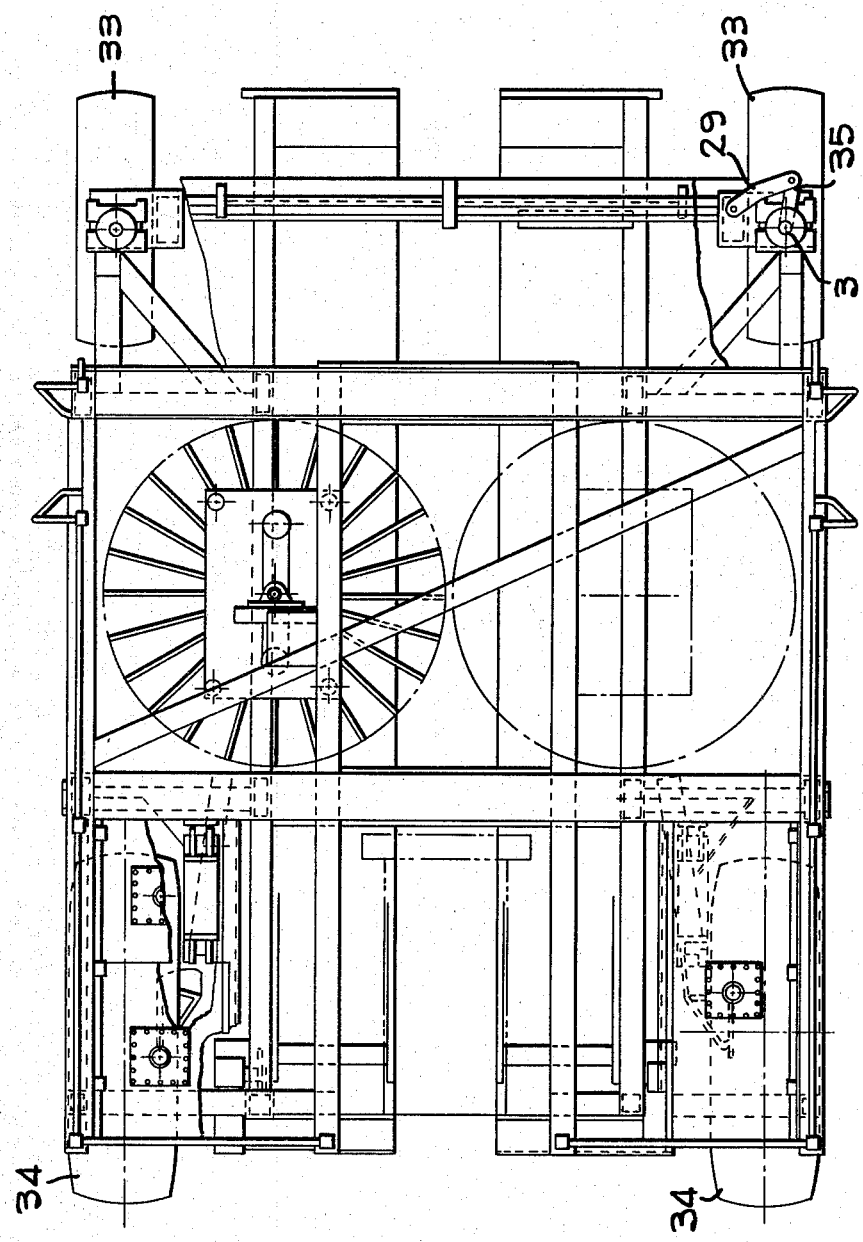

LIFTING AND STEERING SYSTEM FOR A VEHICLE AND A VEHICLE USING THE SAME

The present invention refers to a lifting and steering system for a vehicle which is particularly adequate for use in a heavy duty motor vehicle and especially suitable for use in a coffee harvester or the like.

The object of the present invention is to provide a system of the above type which is of a simple robust construction, is safe and dependable in operation together with an excellent efficiency.

The system according to the present invention is characterized by comprising a main cylinder having a first closed end, a piston slidably and rotatably received within the cylinder to define a pressure chamber between it and said first end of the cylinder, means for introducing and withdrawing pressure fluid from said pressure chamber, piston rod means fixed to said piston and having one end projected through the other end of the cylinder, and piston rotation means having one end projected through first said closed end of the cylinder, neans further being provided to prevent relative rotation between said piston rotation means and the piston itself.

In the preferred embodiment of this invention, a vehicle is characterized by rotation means which comprise a rod projected through a closed end of the cylinder, rotatable by a steering control and having a lower end projected through a pressure chamber and also through said piston, the means for preventing rotation comprising a non-circular section of the lower end of the piston rotation rod and an opening through said piston having a shape which corresponds to said noncircular section.

The present invention will now be described with respect to its present preferred embodiment, by means of example, with reference to the attached drawings, in which:

FIG. 1 is a cross-sectional view of a cylinder and piston arrangement of the lifting and steering system according to the present invention;

FIG. 2 is a cross-sectional view taken along line 2—2 of FIG. 1;

FIG. 3 is an end view of the cylinder and piston arrangement taken in the direction of arrows 3—3 of FIG. 1;

FIG. 4 is a side view of a vehicle incorporating the arrangement of FIGS. 1-3; and FIG. 5 is a top view of the vehicle showing in detail the compensating arm for the wheels.

With reference to the drawings, FIG. 1 shows a lifting and steering arrangement in accordance with the preferred embodiment of this invention, said arrangement comprising a main outer cylinder 1 having its upper end closed by a cover 24. A piston 6 within the cylinder is provided externally with a packing ring 12 serving to seal against the passage of oil between the inner wall of cylinder 1 and the piston and also a "Delrin" ring 13. Piston 6 is in the form of a sleeve with an axial opening of hexagonal section which serves as a guide for the lower portion 3', also hexagonal, of a rod 3 which guides piston 6 without moving axially therewith.

Above the lower hexagonal portion 3' the rod 3 has a circular cross section received in a bearing 21 fixed by means of a nut 22 having a locking washer 23, the upper cover 24 of the outer cylinder 1 being above said nut. Cover 24 is fixed by bolts 25 to the cylinder and is provided with inner annular grooves to receive a seal and a ring of "Delrin" 26, 27, respectively, in sealing relation with the upper end portion of rod 3 which passes through said cover.

The inner cylinder 2 is fixed in a fluid type manner to the lower side of piston 6 by means of six bolts 8 uniformly arranged around the periphery of the piston in positions corresponding to the sides of the hexagonal opening, two pins 9 being used for correctly positioning the two parts. Cylinder 2 whose lower end is closed, serves as a rod for piston 6, slidably moving within the collar 15 fixed by bolts 16 to a flange 17 which is integral with the lower end of cylinder 1, said collar 15 being provided with a dust seal 18 and a ring of "Delrin" 19.

The lower end of hexagonal portion 3' of rod 3 projects through the piston to the interior of cylinder 2, it being prevented from being withdrawn therefrom by means of a pin 5 received in a transverse bore 4. Inner cylinder 2 is provided with two through bores 10 positioned diametrically opposite each other at any suitable height to permit the placement of stop pin 5 when it is placed in bore 4 during mounting of the arrangement. After inserting pin 5, bores 10 are closed in a fluid type manner with plugs 11 having inner hexagonal key-ways for ensuring that cylinder 2 be hermetically closed.

Piston 6 is further provided with passages 7 in the form of grooves at the vertices of the hexagonal section of the opening therethrough, such passages ensuring controlled flow of hydraulic fluid along rod 3, through the piston.

The space within cylinder 1 and above piston 6 comprises a first pressure chamber 30 for hydraulic oil (or other pressure fluid), such fluid being supplied through an opening 29 in the cylinder. The fluid entering pressure chamber 30 flows in a controlled manner along the passage 7 to the interior of the inner cylinder 2 which defines a second pressure chamber 31.

The annular space 14 between cylinders 1 and 2 communicates to the atmosphere through a passage 20 having an air filter arranged in the outer cylinder 1.

Finally, the upper part of rod 3 which is still below top cover 24 has a key-way 28 to receive a key (not shown) for connection to the steering control of a vehicle.

Outer cylinder 1 of the arrangement described above and illustrated in FIGS. 1, 2 and 3 is destined to be mounted on the structure of a vehicle while a lower plate 32 is welded to the lower end of the inner cylinder or piston rod 2 so as to support the half-shaft of one of the steerable wheels of the vehicle. In use, hydraulic oil is admitted through opening 29, filling the first pressure chamber 30 and passing in a controlled flow through passages 7 to the second pressure chamber 31. This obviously results in a downward movement of piston 6 with respect to cylinder 1, that is to say, the vehicle structure or chassis will be raised with respect to the ground.

FIG. 1 shows the arrangement in its extended position and it should be observed that the drawing shows it in shortened form—see the three cuts a, b and c. On removing fluid from opening 29, the operation is inverted and the cylinder 2 enters into cylinder 1 with the piston sliding upwardly so that the vehicle is lowered with respect to the ground.

FIGS. 4 and 5 are a diagrammatic showing of two arrangements identical to that of FIGS. 1, 2 and 3 in a coffee harvester machine. These Figures show that the vehicle has two steerable wheels 33 and two back wheels 34. Each front wheel 33 may be steered by means of a separate arrangement in accordance with this invention, each said wheel having its half-shaft mounted from the above mentioned plate 31 (see FIGS. 1 and 4). The upper end of rod 3 of each lifting and steering unit may be rotated by means of a steering control 35 which is common to the two front wheels. On admitting pressure fluid to or withdrawing it from said unit, piston 6 will be lowered or raised in cylinder 1 to lift or lower the vehicle. There will not, however, be any axial movement of rod 3 due to the possibility of piston 6 sliding axially with respect thereto. Due to the non-circular (hexagonal) section of the lower portion 3' of rod 3 and of the opening in the piston, rotary movements are transmitted to the piston and thus also to plate 32 and the respective front wheel 33.

Another characteristic shown in FIG. 5 is that the vehicle may pivot about one of its back wheels 34, this being enabled by the two piston and cylinder units being controlled by a single steering mechanism but with a compensatory arm 29 being incorporated therewith whereby the front wheels 33 can be turned through different angles in response to a single steering control movement. This is particularly useful when the vehicle, reaching the end of a row of bushes, has to turn through 180° to begin to harvest the beans of the bushes in the next row.

Normally the hydraulic oil is applied to and withdrawn from the two lifting and steering units for the two front wheels at the same rate. The flows, however, could be controlled independently so as to permit levelling of the vehicle when the ground is very bumpy or inclined.

Although the lifting and steering unit shown in FIGS. 1, 2 and 3 is preferred, another possibility would be the use of a simple hydraulic cylinder in which the piston rod projects both sides therefrom. In this case, however, the free end of the upper rod would have an axial movement with respect to steering control 35, the same hexagonal section arrangement of the piston system of FIGS. 1, 2 and 3 being used. This, however, would have the disadvantage that a considerable length of the rod would move up and down in the vicinity of the vehicle operator.

One particular advantage which is considered to be of importance and is obtained in the unit of FIGS. 1, 2 and 3, stems from the use of two pressure chambers 30 and 31, which ensure full use of the inner cross section of cylinder 1 as a pressure area, thus permitting one to use lower pressures in the hydraulic system than would be the case in the absence of pressure chamber 31. Apart from this, the two pressure chambers system obviously avoids the problem of oil leakage through the hexagonal gap between rod 3 and piston 6.

Although the best mode contemplated for carrying out the present invention has been herein shown and described, it will be apparent that modification and variation may be made without departing from what is regarded to be the subject matter of the invention as defined in the appended claims.

What I claim is:

1. Lifting and steering system for a vehicle, characterized by comprising a main cylinder having a first closed end, a piston slidably and rotatably received within the cylinder to define a pressure chamber between said piston and said first end of the cylinder, means for introducing and withdrawing pressure fluid from the said pressure chamber, piston rod means fixed to said piston and having one end projected through the other end of the cylinder, piston rotation means having one end projected through the said first closed end of the cylinder, and means being provided to prevent relative rotation and yet allow axial movement between said piston rotation means and the piston itself.

2. Lifting and steering system for a vehicle according to claim 1, characterized in that said piston rotation means is a rod and said means for preventing relative rotation comprises a polygonal guide in one of said piston and rod, and a sleeve cooperating therewith on the other.

3. Lifting and steering system for a vehicle according to claim 2, characterized in that said polygonal guide is provided on the rod and the sleeve on the piston.

4. Lifting and steering system for a vehicle according to claim 3, characterized in that the polygonal guide is hexagonal.

5. Lifting and steering system for a vehicle according to claim 4, characterized in that a second pressure chamber is integrally formed with the piston and said rod formed with the polygonal guide passes through the piston to the interior of said second pressure chamber, passage means being formed through said piston for controlled flow of pressure fluid between said two pressure chambers.

6. Lifting and steering system for a vehicle according to claim 5, characterized in that said passage means for the controlled flow of fluid comprises passages arranged at the vertices of said hexagonal cross section.

7. Lifting and steering system for a vehicle according to claim 6 characterized in that said piston rotating rod further comprises a stop limiting its maximum movement outwardly from said second chamber.

8. Lifting and steering system for a vehicle according to claim 7, characterized in that said stop comprises a pin disposed in a through bore in said piston rotating rod and projecting laterally therefrom.

9. Lifting and steering system for a vehicle according to one of claim 8, characterized in that the piston rod means comprises a second cylinder having one end which is open but fixed to the piston on that side thereof opposite to that of the first pressure chamber, and a second closed end projected through the second end of said main cylinder, the interior of said second cylinder defining said second pressure chamber.

10. Lifting and steering system for a vehicle according to claim 9, characterized in that the second end of the main cylinder is internally provided with guide means for guiding said second cylinder.

11. Vehicle provided with a steering control for the front wheels and a lifting system for raising and lowering the vehicle with respect to the front wheels, characterized in that said steering control is connected to each front wheel through a combined lifting and steering system comprising a main cylinder having a first closed end, a piston slidably and rotatably received within the cylinder to define a pressure chamber between said piston and said first end of the cylinder, means for introducing and withdrawing pressure fluid from the said pressure chamber, piston rod means affixed to said piston and having one end projected through the other end of the cylinder, piston rotating means having one end projected through the first closed end of the cylinder, and means for preventing a relative rotation between the piston rotating means and said piston.

12. Vehicle according to claim 11, characterized in that said piston rotating means comprise a rod extending through said closed end of the cylinder and rotatable by said steering control and having a lower end projecting through said pressure chamber and further through said piston, the rotation means comprising a polygonal section at the lower end of the piston rotating rod and an opening through the piston having a shape corresponding to said polygonal section.

13. Vehicle according to claim 12, characterized in that a second pressure chamber is integral with the piston and said rod formed with the polygonal guide passes through the piston to the interior of said second pressure chamber, passage means being formed through the piston for control flow of pressure fluid between the two said pressure chambers 14. Vehicle according to claim 13, characterized by comprising a compensating arm for said steering system whereby the front wheels pivot through different angles of rotation and the vehicle may turn about its back wheels.

* * * * *